United States Patent [19]

Davis et al.

[11] Patent Number: 4,810,729
[45] Date of Patent: Mar. 7, 1989

[54] FLEXIBLE FLAME RESISTANT POLYURETHANE FOAMS

[75] Inventors: Pauls Davis, Gibraltar; Oscar M. Grace, Troy; Steven E. Wujcik, Wyandotte, all of Mich.

[73] Assignee: BASF Corporation, Parsippany, N.J.

[21] Appl. No.: 111,854

[22] Filed: Oct. 23, 1987

[51] Int. Cl.$^4$ .................... C08J 9/00; C08G 18/48
[52] U.S. Cl. ......................... 521/94; 521/906
[58] Field of Search .................... 521/94, 906

[56] References Cited

U.S. PATENT DOCUMENTS

| | | | |
|---|---|---|---|
| 2,975,146 | 3/1961 | Rogers et al. | 521/164 |
| 3,462,517 | 8/1969 | Hansen et al. | 521/94 |
| 3,899,454 | 8/1975 | Wagner et al. | 521/159 |
| 4,140,667 | 2/1979 | Preston et al. | 521/137 |
| 4,176,218 | 11/1979 | Demon et al. | 521/137 |
| 4,221,877 | 9/1980 | Cuscurida et al. | 521/160 |
| 4,568,705 | 2/1986 | Grace et al. | 521/137 |

Primary Examiner—John Kight
Assistant Examiner—Dennis R. Daley
Attorney, Agent, or Firm—Bruce E. Harang

[57] ABSTRACT

The invention pertains to flame retardant polyurethane foams prepared by the reaction of a polyoxyalkylene polyether polyol with toluene diisocyanate and a blowing agent wherein the flame retardant compound is selected from the group consisting of dicyandiamide, oxamide and biuret. The amount of flame retardant may range from about 25 weight percent of about 75 weight percent of the total composition.

5 Claims, No Drawings

FLEXIBLE FLAME RESISTANT POLYURETHANE FOAMS

BACKGROUND OF THE INVENTION

1. Field on the Invention

The present invention pertains to flexible foam compositions and in particular to flexible polyurethane flame-resistant foam compositions and methods for the preparation thereof. More particularly, the present invention relates to the preparation of flexible polyurethane flame-resistant foam compositions which contain an effective amount of dicyanodiamide, oxamide and biuret as the sole flame retardant.

2. Description of the Prior Art

The preparation of flexible polyurethane flame-resistant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retardant, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)-phosphate and an unsubstituted trialkylphosphate such as, for example triethylphosphate. U.S. Pat. No. 4,293,657 teaches the use of melamine polyol dispersions wherein the melamine particles are ground in situ with the polyol and wherein specific dispersion stabilizers are employed. U.S. Pat. No. 4,221,875 teaches the use of melamine in rigid polyurethane foam. U.S. Pat. No. 4,258,141 teaches the use of various cyanic acid derivatives in preparing flame resistant flexible foams but teaches away from using toluene diisocyanate as the isocyanate compound.

SUMMARY OF THE INVENTION

The present invention applies to flexible polyurethane foam compositions which are prepared by the reaction of a polyoxyalkylene polyether polyol compound having 2 to 4 active hydrogen atoms and an equivalent weight range from 750 to 3000 with toluene diisocyanate in the presence of an effective amount of a flame retardant selected from the group consisting of dicyandiamide, oxamide and biuret in the absence of any dispersion stabilizers. The amount of flame retardant may range from about 20 weight percent to about 60 weight percent of the total composition.

For a more complete understanding of the present invention, reference is made to the following detailed description and the examples thereof.

DESCRIPTION OF THE PREFERRED EMBODIMENTS

It has unexpectedly been found that, in the preparation of flexible flame-retarded polyurethane foam products, the amount of flame retardant compound necessary to impart flame retardency may range from about 20 weight percent to about 60 weight percent of the total composition. Lesser amounts will be insufficient to impart flame retardency while greater amounts will result in poor physical properties of the polyurethane foams. The flame retardants of the invention are selected from the group consisting of dicyandiamide, oxamide and biuret. Dicyandiamide is preferred.

Flexible foams are generally defined as having a high tensile to compressive strength ratio (25% deflection) from 15 to 60 or 70 to 1, high elongation, a fast recovery rate and a high elastic limit. Rigid foams, on the other hand, have a high ratio of compressive to tensile strength, 0.5 to 1 or greater low elongation (less than 10%, a low recovery rate from distortion and a low elastic limit).

Representative polyols which may be employed in the invention are well know to those skilled in the art. They are often prepared by the catalytic condensation of an alkylene oxide or mixture of alkylene oxides, either simultaneously or sequentially, with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxyterminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 500 to 10,000, preferably from 750 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, αβ-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the aame components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 500 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-phenylenediamine, m-phenylenediamine, o-phenylenediamine, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Other polyols which may be employed are graft polymer dispersions in either saturated or unsaturated polyoxyalkylene polyether polyols. Preferred are the graft polymer dispersions prepared employing unsaturated polyols. These are prepared by conducting the in situ polymerization of an ethylenically unsaturated monomer or mixture of monomers in the presence of a free-radical initiator in an unsaturated polyol mixture containing less than 0.1 mole of unsaturation per mole of polyol mixture. The polyol mixture employs as part of the mixture a polyether-ester polyol prepared by the reaction of a polyoxyalkylene polyether polyol with maleic anhydride and capped with an alkylene oxide. This polyether-ester polyol is than isomerized by methods well known to those skilled in the art. Specific details for the preparation of the polyetherester polyol are found in U.S. Pat. No. 4,550,194 the disclosure of which is incorporated by reference.

Chain transfer agents are preferentially employed as reaction moderators for the polymerization of the ethylenically unsaturated monomers. The polymerization reaction may be carried out at temperatures between 25° C. and 180° C., preferably between 80° C. and 135° C. The polyol mixture contains less than 0.1 mole of unsaturation per mole of polyol mixture and preferably ranges from 0.001 to 0.09 mole of unsaturation per mole of polyol.

Among those reaction moderators which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethyl-p-toluidine, m-cyano-p-toluinitrile, α, α'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-naphthalenethiol, 2-naphthalenethiol, 1-octanethiol, 1-heptanethiol, 2-octanethiol, 1-tetradecanethiol, α-toluenethiol, isopropanol, 2-butanol, toluene, bromochloromethane, 1-butanol, carbon tetrachloride, 2-mercaptoethanol, octadecyl mercaptan, carbon tetrabromide and tertiary dodecyl mercaptan.

The reaction moderators employed will depend on the particular monomers or mixtures of monomers employed and the molar ratios of such mixtures. The concentration of the reaction moderator is that amount which is effective and may range from 0.1 to 10 percent by weight based on the weight of monomer, preferably from 0.5 to 2.0 weight percent based on the weight of monomer.

The unsaturated polyols or macromers which are employed in the present invention may be prepared by the reaction of any conventional polyol such as those described above with a compound selected from the group consisting of maleic acid, maleic anhydride and fumaric acid. Thereafter the unsaturated polyol may be reacted with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The alkylene oxides which may be employed for the preparation of te polyetherester polyols include ethylene oxide, propylene oxide, butylene oxide, amylene oxide and mixtures of these oxides, preferably ethylene and propylene oxide.

The maleated macrmers are preferably isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer and may be as high as 5.0 weight percent.

When preparing the polyetherester polyol employing the catalyst selected from the group consisting of salts and oxides of divalent metals, the concentration of catalyst which may be employed ranges from 0.01 to 0.5 weight percent based on the weight of polyol mixture. The temperatures employed range from 75° C. to 175° C. The equivalent weight of the polyol employed to prepare the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the esterification, inhibit this isomerization.

The macromer unsaturation ranges from 0.1 mole to 1.5 mole of unsaturation per mole of polyol and, preferably, from 0.5 to 1.0 mole of unsaturation per mole of polyol.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, norbornadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2- butoxy-2'-vinyloxy diethyl ether, vinyl methyl ketone, vinyl ethyl ketone, vinyl phosphonates such as vinyl phenyl ketone, n-vinyl carbazole, vinyl ethyl sulfone, N-methyl-N-vinyl acetamide, N-vinylpyrrolidone, vinyl imidazole, divinyl benzene, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is styrene.

The amount of ethylenically unsaturated monomer employed in the polymerization reaction is generally from 25 percent to 75 percent, preferably from 30 percent to 50 percent, based on the total weight of the dispersion. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di- t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, iso- propyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2methyl heptonitrile), 1,1'- azo-bis(cyclohexane carbo-nitrile), 4,4'-azobis(4-cyanopentanoic acid), 2,2'-azobis(isobutyronitrile), 1-t-butylazo-1-cyanocyclohexane, persuccinic acid, heptonitrile), 1,1'-azo-bis(cyclohexane carbo-nitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4methoxy-4-methylpentane,2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2-tbutylazo-2-cyano-4-methylpentane, 2-t-butylazo-2-isobutyronitrile, butylperoxyisopropyl carbonate and the like; a mixture of initiators may also be used. The preferred initiators are 2,2'-azobis(2-methylbutanenitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2- cyano-4-methylpentane, and 2-t-butylazo-2-cyanobutane. Generally, from about 0.01 percent to about 5 percent, preferably from about 0.5 percent to about 1.5 percent, by weight of initiator based on the weight of the monomer will be employed in the process of the invention.

The graft polymer dispersions of this invention have useful viscosities less than 10,000 cps at 25° C. Preferably they have viscosities ranging from 2000 to 8000 cps at 25° C.

Also, polyols containing ester groups can be employed in the subject invention These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'- dimethyldiphenylmethane-2,2'-5,5'-tetraisocyanate and polymeric polyisocyanates such as polymethylene polyphenylene polyisocyanate. Most preferred are toluene diisocyanates.

Crude polyisocyanates may also be used in the compositions of the present invention, such as crude toluene diisocyanate obtained by the phosgenation of a mixture of toluene diamines or crude diphenylmethane diisocyanate obtained by the phosgenation of crude diphenylmethane diamine.

The polyoxyalkylene polyether polyols may be employed along with another polyhydroxyl-containing component commonly employed in the art. Any of the polyhydroxyl-containing components which are described above for use in the preparation of the polyols may be employed in the preparation of the polyurethane foams useful in the present invention. Optionally chain extenders and other additives may be employed.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Among the flame retardant compounds in conjunction with melamine which may be employed are tetrakis(2-chloroethyl) ethylene phosphonate, pentabromodiphenyl oxide, tris(1,3-dichloropropyl) phosphate, tris(beta-chloroethyl) phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)-phosphate, and tris(beta-chloropropyl)phosphate.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride,dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Density—D1622—63.
California Bulletin No. 117 Test MVSS 302

The following abbreviations are employed in the examples below:

Polyol A is a propylene oxide/ethylene oxide adduct of trimethylolpropane containing a 5 percent cap of ethylene oxide having a hydroxyl number of 27.

Polyol B is a propylene oxide/ethylene oxide adduct of glycerine containing a 16.5 percent cap of ethylene oxide having a hydroxyl number of 35.

Polyol C is Polyol A reacted with 1.7 percent maleic anhydride capped with propylene oxide and isomerized to fumarate.

Polyol D is a propylene oxide adduct of propylene glycol having a hydroxyl number of 145.

Polyol E is a blend of 96.2 percent Polyol D, 3.8 percent Polyol C.

Polyol F is Polyol E containing 50 percent of 2:1 styrene:acrylonitrile having a hydroxyl number of about 70.0.

Polyol G is a blend of 87 percent Polyol B, 8 percent Polyol F and 5 percent of tris-(β-chloroethyl)phosphate.

DEOA is diethanolamine.

Silicone 5043 is a silicone surfactant manufactured by Dow Corning Corporation.

T-12 is dibutyltin dilaurate.

T-10 is stannous octoate in dioctylphthalate.

Freon 11 is monoflurotrichloromethane.

Dabco 33LV is a 33 percent solution of triethylene diamine in dipropylene glycol.

Niax A-1 is an amine catalyst manufactured by Union Carbide Corporation.

TDI is toluene diisocyanate.

L-6202 is a silicone surfactant sold by Goldschmidt, Inc.

EXAMPLES 1-13

The polyurethane foams of Table I were prepared by changing a container with a suitable quantity of the reactants, as listed with the exception of the isocyanate, as tabulated. The mixture wa stirred for about 30 seconds and allowed to set until the air bubbles had dissipated. The calculated amount of polyisocyanate was added to the container, the resulting mixture was stirred for about 35 seconds, and the foam was allowed to rise therein. After the foam rise was completed, the resulting foam was cured for about seven days at room temperature. The physical properties were then determined.

TABLE I

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Formulation | | | | | | | | | | | | | |
| Polygol G | 100 | → | → | → | → | → | → | → | → | → | → | → | → |
| Melamine | 100 | 75 | 50 | 25 | — | 75 | 50 | 25 | — | 75 | 50 | 25 | — |
| Oxamide | — | 25 | 50 | 75 | 100 | — | — | — | — | — | — | — | — |
| Biuret | — | — | — | — | — | 25 | 50 | 75 | 100 | — | — | — | — |
| Dicyandiamide | — | — | — | — | — | — | — | — | — | 25 | 50 | 75 | 100 |
| Water | 2.4 | → | → | → | → | → | → | → | → | → | → | → | → |
| DC-5043 | 1.4 | → | → | → | → | → | → | → | → | → | → | → | → |
| DEOA | 1.4 | → | → | → | → | → | → | → | → | → | → | → | → |
| DABCO 33LV | 0.18 | → | → | → | → | → | → | → | → | → | → | → | → |
| NIAX A-1 | 0.06 | → | → | → | → | → | → | → | → | → | → | → | → |
| T-12 | 0.1 | → | → | → | → | → | → | → | → | → | → | → | → |
| T-10 | — | — | — | — | — | — | — | — | — | 0.3 | 0.3 | 0.3 | 0.4 |
| FREON 11 | 5.0 | → | → | → | → | → | → | → | → | → | → | → | → |
| L-6202 | — | 0.1 | → | → | → | → | → | → | → | — | — | — | — |
| TDI (Index 110) | 35 | → | → | → | → | → | → | → | → | → | → | → | → |
| Physical Properties | | | | | | | | | | | | | |
| Density Kg/M$^3$ | 58.9 | 59.1 | 56.5 | 60.9 | 62.1 | 53.2 | 51.7 | 51.6 | 58.0 | 60.2 | 60.1 | 63.4 | 60.1 |
| Oxygen Index | 37.5 | 27.5 | 28.5 | 29.5 | 28.5 | 28.5 | 28.5 | 27.5 | 37.5 | 29.5 | 29.5 | 29.5 | 29.5 |
| California 117 | | | | | | | | | | | | | |
| Afterflame, sec. | | | | | | | | | | | | | |
| ave. | 0 | 0.8 | 0.6 | 2.2 | 1.6 | 3.6 | 3.8 | 2.8 | 1.0 | 0.6 | 1.0 | 1.0 | 1.0 |
| max. | 0 | 1.0 | 1.0 | 4.0 | 3.0 | 6.0 | 5.0 | 5.0 | 1.0 | 1.0 | 1.0 | 1.0 | 1.0 |
| Char Length, Cm | | | | | | | | | | | | | |
| ave. | 2.5 | 4.1 | 4.3 | 3.8 | 2.8 | 5.6 | 5.1 | 2.8 | 2.0 | 4.3 | 5.1 | 4.6 | 4.6 |
| max. | 3.6 | 5.1 | 4.6 | 4.1 | 3.3 | 6.4 | 5.6 | 3.0 | 2.3 | 4.6 | 5.8 | 5.3 | 4.8 |

The embodiments of the invention in which an exclusive privilege or property is claimed are defined as follows:

1. A flame retardant flexible polyurethane foam obtained by reacting in the presence of a blowing agent
   (a) a polyoxyalkylene polyether polyol dispersion having an average equivalent weight of from about 750 to about 3000 wherein the polyol has incorporated therein, in the absence of a dispersion stabilizer from about 20 weight percent to about 60 weight percent a flame retardant selected from the group consisting of dicyanodiamide, oxamide and biuret,
   (b) a organic polyisocyanate, and
   (c) with or without chain extenders or and other additives.

2. The foam of claim 1 wherein the organic polyisocyanate in toluene diisocyanate.

3. The foam of claim 1 wherein the polyol is a graft polymer containing from 25 weight percent to 75 weight percent based on the total weight of the dispersion of an ethylenically unsaturated monomer or mixture of monomers.

4. The foam of claim 1 wherein the polyol is a propylene oxide, ethylene oxide adduct of glycerine containing from about 25 weight percent to about 75 weight percent of a 1:1 to 3:1 styrene:acrylonitrile graft polymer.

5. The foam of claim 1 wherein the polyol is a propylene oxide, ethylene oxide adduct of trimethylolpropane containing from about 25 weight percent to about 75 weight percent of a 1:1 to 3:1 styrene:acrylonitrile graft polymer.

* * * * *

UNITED STATES PATENT AND TRADEMARK OFFICE
CERTIFICATE OF CORRECTION

PATENT NO.   : 4,810,729
DATED        : Mar. 7, 1989
INVENTOR(S)  : Pauls Davis Et Al It is certified that error appears in the above-identified patent and that said Letters Patent is hereby corrected as shown below:

Cols. 9 and 10, Table I, line 15; incorrectly reads

"T-12  0.1  -→  -→  -→  -→  -→  -→  -→  -→  -→  -→  -→  -→"

and should correctly read

-- T-12  0.1  -→  -→  -→  -→  -→  -→  -→  -→  --  --  --  --  --

Signed and Sealed this

Twenty-eighth Day of November 1989

Attest:

JEFFREY M. SAMUELS

*Attesting Officer*     *Acting Commissioner of Patents and Trademarks*